United States Patent [19]

Waggoner

[11] 4,218,936
[45] Aug. 26, 1980

[54] LOCK MECHANISM FOR SERVICE BRAKE

[75] Inventor: Van E. Waggoner, Dubuque, Iowa

[73] Assignee: Deere & Company, Moline, Ill.

[21] Appl. No.: 917,499

[22] Filed: Jun. 21, 1978

[51] Int. Cl.² .......................... G05G 1/14; G05G 5/06
[52] U.S. Cl. ........................................ 74/512; 74/520;
74/529; 74/539
[58] Field of Search ............... 74/512, 529, 560, 520,
74/539, 542, 528

[56] References Cited

U.S. PATENT DOCUMENTS

| 669,475 | 3/1901 | Bullard | 74/539 |
|---|---|---|---|
| 698,212 | 4/1902 | Miller | 74/539 |
| 826,198 | 7/1906 | Snyder | 74/529 |
| 914,277 | 3/1909 | Howe | 74/539 |
| 1,498,926 | 6/1924 | Neal | 74/542 |
| 1,563,035 | 11/1925 | Losee | 74/520 |
| 1,608,382 | 11/1926 | Fox | 74/539 |
| 1,614,289 | 1/1927 | Dominguez | 74/539 |
| 2,175,445 | 10/1939 | Rasmussen | 74/512 |
| 2,915,916 | 12/1957 | Hinsey et al. | 74/542 X |
| 3,003,365 | 10/1961 | McKenzie | 74/529 X |
| 3,273,418 | 9/1966 | Ellis | 74/529 X |
| 3,861,237 | 1/1975 | Mounts | 74/539 X |
| 4,037,487 | 7/1977 | Ahlschwede et al. | 74/529 |

FOREIGN PATENT DOCUMENTS

| 475283 | 5/1915 | France | 74/539 |
|---|---|---|---|
| 815056 | 6/1959 | United Kingdom | 74/529 |
| 815057 | 6/1959 | United Kingdom | 74/529 |

*Primary Examiner*—Leslie Braun

[57] ABSTRACT

A foot-operated brake pedal carries a foot-operated pawl operative for locking the pedal in a brake-engage position.

1 Claim, 2 Drawing Figures

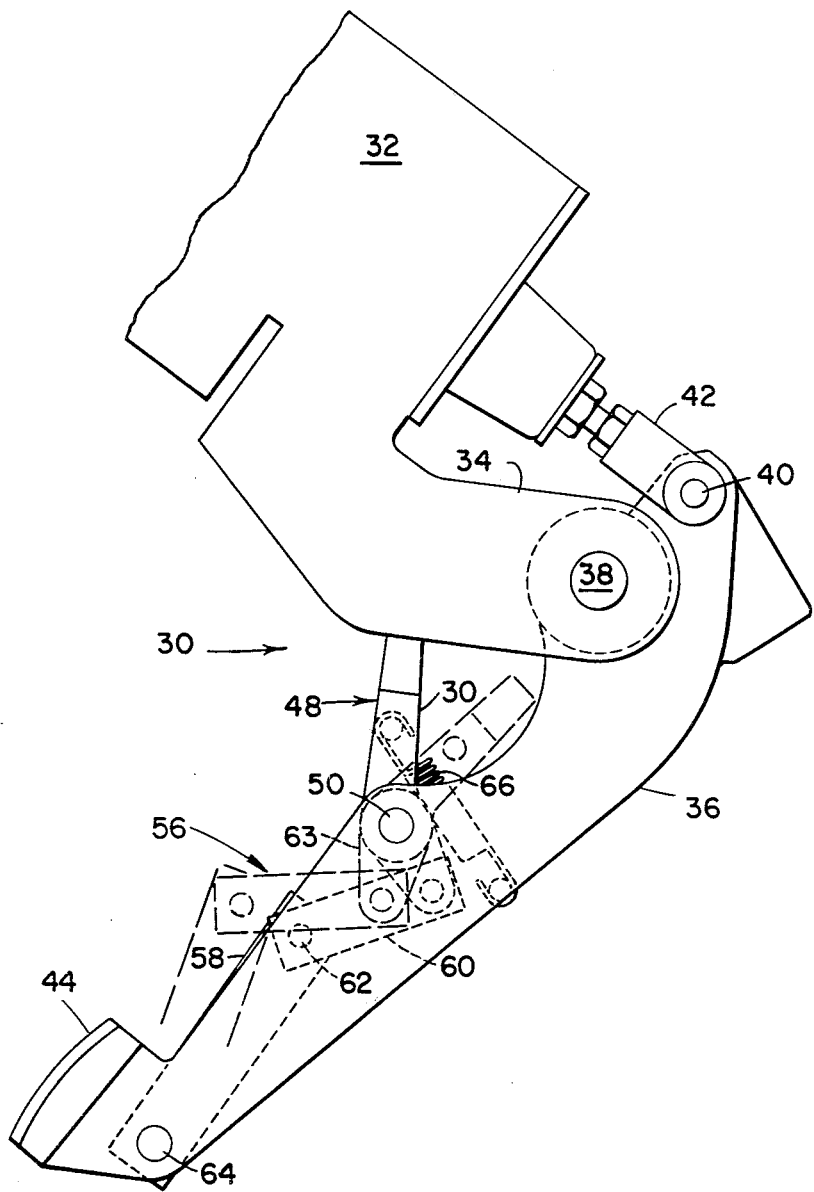

LOCK MECHANISM FOR SERVICE BRAKE

BACKGROUND OF THE INVENTION

The present invention relates to vehicle brakes and more particularly relates to brake pedal arm lock mechanisms for selectively releasably locking service brake pedal arms in their brake-engage positions.

The use of some sort of brake pedal arm lock mechanism for releasably locking the brake pedal arm of a vehicle in its brake-engage position is well known and has been applied to forestry vehicles, for example, where it is desired that the vehicle be held stationary during winching operations or when an operator leaves the vehicle with the engine running as he might do when connecting winch cables to felled trees, or the like. One such lock mechanism is illustrated in U.S. Pat. No. 4,037,487 granted to Ahlschwede et al on July 26, 1977.

One feature of the Ahlschwede et al patented design, which is important and is also present in applicant's design, is that the lock mechanism is designed to be operated by the same foot used to operate the brake pedal arm. However, the patented design has the drawback that in order for the lock mechanism to be activated the operator must first engage his foot with a control member and then depress it together with the break pedal. Thus if the operator should inadvertently forget to first engage the control member, then he must release the brake pedal so that he may operate the control member and pedal together and while he is doing so the vehicle may undergo undesirable rolling. The patented design has the further drawback that it is somewhat complicated.

SUMMARY OF THE INVENTION

According to the present invention, there is provided a novel lock mechanism for releasably retaining a brake pedal arm in its brake-engage position.

An object of the invention is to provide a lock mechanism which is selectively operable by an operator's foot positioned on a foot pad of the pedal arm. This object is achieved by connecting a linkage between the pedal arm and locking pawl such that a flexed "knee joint" is located in the vicinity of the pedal foot pad so as to be selectively engaged by the operator's foot and straightened to effect rotation of the pawl to its pedal arm lock position when the pedal arm is depressed.

Another object is to provide a lock mechanism which is of a relatively simple, easy to maintain construction.

These and other objects will become apparent from a reading of the appended description together with the appended drawings.

BRIEF DESCRIPTION OF THE DRAWING

The sole FIGURE is a side elevational view of a service brake and park lock combination constructed in accordance with the principles of the present invention.

DESCRIPTION OF THE PREFERRED EMBODIMENT

Referring now to the drawing, therein is shown a brake actuator 30 including a brake valve housing 32 having a forward projection defining a bracket 34. A brake pedal arm 36 has a location slightly below its upper end mounted to the bracket by a horizontal transverse pin 38 and has its upper end pivotally connected, as at 40, to a pair of valve plungers 42 (only one shown) connected to respective brake valves (not shown) reciprocably mounted in the housing 32. As is conventional, the brake valves have return springs (not shown) associated therewith which act through the plungers to normally maintain the arm 36 in a rearward brake-release position from which the arm 36 may be depressed, by applying a force to a foot pad 44 at the lower end of the arm, to move to a forward brake-engage position, as shown.

For the purpose of selectively locking the pedal arm 36 in its brake-engage position, there is provided a locking mechanism 46 including a locking pawl 48 pivotally connected to the arm 36, at a location below the bracket 34, by a transverse pin 50. The locking mechanism 46 further includes a linkage comprising first and second links 58 and 60 having respective first ends pivotally interconnected, as at pin 62, to form a "knee joint", with the second end of the link 60 being pivotally connected to a crank arm 63 of the pawl 48 and with the second end of the link 58 being pivotally connected to the arm 36 by a transverse pin 64 located below the foot pad 44. The lengths of the links 58 and 60 are such that the "knee joint" is flexed to a location rearwardly of the arm 52 and above the pad 54 when the pawl 48 is in a pedal arm-release position, as illustrated in dashed lines. It will be appreciated that the "knee joint" may be selectively reached and depressed by the foot of an operator holding the pedal arm depressed so as to straighten the flexed joint and in that way effect rotation of the pawl 48 to its pedal arm-lock position shown in solid lines. A tension spring 66 is connected between the pawl 48 and pedal arm 36 and acts to bias the pawl toward its arm-release position, it being noted that this biasing force is overcome by the return force exerted on the abutment surface of the bracket 34 via the pawl 48 when the pedal arm 36 is depressed and the pawl is in its arm-lock position as illustrated in solid lines. Thus, it will be apparent that the pawl 48 will automatically return to its dashed line arm-release position upon the operator despressing the arm 36 sufficiently to overcome the return force.

The operation of the arm lock mechanism is thought to be clear from the foregoing and for the sake of brevity no further description of the operation is given.

What is claimed is:

1. A combined service and park brake arrangement, comprising: a support; a pedal arm pivotally mounted on the support for movement about a first axis between brake-release and brake-engage positions; biasing means mounted between the support and arm and urging the latter toward its brake-release position; a locking pawl pivotally mounted on the arm for movement about a second axis, extending parallel to the first, between an arm lock position, wherein it engages the support and prevents movement of the arm from its brake-engage position, and an unactuated position wherein it permits free movement of the arm between the brake-release and brake-engage positions; linkage means mounted solely on the arm and being pivotally connected between the arm and pawl and selectively operable to move the pawl between its arm lock and unactuated positions; said pedal arm including an integral foot pad facing in a first direction for engagement by an operator's foot; said linkage means including a first link having a first end pivotally connected to the pawl, a second link having a first end pivotally connected to the pedal arm adjacent said foot pad and the first and second links being of such length and having respective second ends pivotally interconnected to each other to form a knee joint which is displaced from the pad in a second direction 90° from the first direction and is elevated from the pedal arm in said first direction when the pawl is in its arm release position and is depressable to a position alongside the pedal arm to move the pawl to its arm lock position; and a pawl return spring connected between the pawl and the pedal arm and biasing the pawl toward its arm release position.

* * * * *